(12) United States Patent
Sachtleben et al.

(10) Patent No.: US 11,367,202 B2
(45) Date of Patent: Jun. 21, 2022

(54) OPTICAL MONITORING OF THREADED CONNECTION MAKE-UP AND BREAK-OUT PROCESSES

(71) Applicant: WEATHERFORD TECHNOLOGY HOLDINGS, LLC, Houston, TX (US)

(72) Inventors: Benjamin Sachtleben, Hannover (DE); David Geissler, Hannover (DE); Christina Hebebrand, Hannover (DE); Rainer Ruehmann, Hannover (DE)

(73) Assignee: Weatherford Technology Holdings, LLC, Houston, TX (US)

( * ) Notice: Subject to any disclaimer, the term of this patent is extended or adjusted under 35 U.S.C. 154(b) by 0 days.

(21) Appl. No.: 16/874,405

(22) Filed: May 14, 2020

(65) Prior Publication Data
US 2021/0358136 A1  Nov. 18, 2021

(51) Int. Cl.
*E21B 17/042* (2006.01)
*E21B 19/16* (2006.01)
*G06T 7/269* (2017.01)

(52) U.S. Cl.
CPC ............ *G06T 7/269* (2017.01); *E21B 17/042* (2013.01); *E21B 19/165* (2013.01); *G06T 2207/10016* (2013.01)

(58) Field of Classification Search
CPC ..... E21B 17/042; E21B 19/165; G06T 7/269; G06T 2207/10016
See application file for complete search history.

(56) References Cited

U.S. PATENT DOCUMENTS

| 7,757,759 B2 | 7/2010 | Jahn et al. |
| 8,899,319 B2 | 12/2014 | Patterson et al. |
| 8,943,905 B2 | 2/2015 | Theiss et al. |

(Continued)

FOREIGN PATENT DOCUMENTS

| DE | 10 2010 034 972 B4 | 7/2013 |
| RU | 2297511 C2 | 4/2007 |

OTHER PUBLICATIONS

Avago Technology; "ADNS-9800 LaserStream Gaming Sensor", company data sheet AV02-2998EN, Dated Jan. 13, 2012, 40 pages.
(Continued)

*Primary Examiner* — D. Andrews
(74) *Attorney, Agent, or Firm* — Smith IP Services, P.C.

(57) ABSTRACT

A method of making-up or breaking-out tubular string components can include threading tubulars with each other while a camera obtains images of the tubulars, outputting image data from the camera to an image processor that detects optical flow vector fields from the image data, the optical flow vector fields representing displacements of the respective tubulars during the threading, and controlling the threading in response to a difference between the displacements. Another method can include positioning a camera so that the camera simultaneously observes at least two tubulars, threading the tubulars with each other, outputting image data from the camera to an image processor, the image processor detecting optical flow vector fields from the image data, the optical flow vector fields representing displacements of the respective tubulars during the threading, and controlling the threading in response to the image processor detecting the optical flow vector fields.

32 Claims, 7 Drawing Sheets

(56) References Cited

U.S. PATENT DOCUMENTS

| | | | |
|---|---|---|---|
| 2005/0077084 A1 | 4/2005 | Kracik et al. | |
| 2013/0300869 A1 | 11/2013 | Lu et al. | |
| 2013/0345878 A1* | 12/2013 | Austefjord | B66C 13/02 700/275 |
| 2014/0233804 A1 | 8/2014 | Gustavsson et al. | |
| 2017/0362905 A1* | 12/2017 | Mailly | G06K 9/6269 |
| 2019/0057516 A1 | 2/2019 | Amezaga et al. | |
| 2019/0119997 A1 | 4/2019 | Helms et al. | |
| 2019/0136650 A1 | 5/2019 | Zheng et al. | |
| 2019/0195034 A1* | 6/2019 | Leite | E21B 19/165 |
| 2020/0088873 A1 | 3/2020 | Blakely et al. | |
| 2020/0224526 A1* | 7/2020 | Parmeshwar | E21B 47/024 |

OTHER PUBLICATIONS

Weatherford; "ComCAM-20/160-SL Bucking Machine", Tech Specs company article 12138.00, dated 2015, 2 pages.

PX4FLOW; "PX4FLOW Smart Camera", Pixhawk Flight Controller Hardware Project, dated Jan. 11, 2014-Oct. 27, 2019, 6 pages.

Weatherford; "TorkWrench 10-160 Mobile Bucking Unit", Tech Specs company article 12028.01, dated 2015, 1 page.

Weatherford; "VERO Automated Connection Integrity", Company article 12927.00, dated 2020, 2 pages.

Weatherford; "VERO Conventional System", Tech Specs company article 12723.03, dated 2017-2018, 2 pages.

Weatherford; "VERO Mechanized System", Tech Specs company article 12923.00, dated 2018, 2 pages.

International Search Report with Written Opinion dated Jun. 28, 2021 for PCT Patent Application No. PCT/US2021/028533, 13 pages.

International Search Report with Written Opinion dated Oct. 14, 2021 for PCT patent application No. PCT/US2021/027880, 19 pages.

* cited by examiner

OPTICAL MONITORING OF THREADED CONNECTION MAKE-UP AND BREAK-OUT PROCESSES

BACKGROUND

This disclosure relates generally to equipment utilized and operations performed in conjunction with a subterranean well and, in an example described below, more particularly provides for optical monitoring of a threaded connection make-up or break-out process.

Various types of tubular components can be threaded together to form tubular strings for use in a well. Tubulars used in wells can include protective wellbore linings (such as, casing, liner, etc.), production or injection conduits (such as, production tubing, injection tubing, screens, etc.), drill pipe and drill collars, and associated components (such as tubular couplings).

It is typically important for threaded connections between tubulars to be properly made-up. For example, when a threaded connection is properly made-up, the threaded connection may prevent leakage of fluid into or out of the tubular string, or may resist unthreading of the connection. When a threaded connection is properly broken-out, the tubulars may be usable in subsequent well operations, such as (but not necessarily) drilling operations.

It will, therefore, be readily appreciated that improvements are continually needed in the art of making-up and breaking-out threaded connections in tubular strings. The present disclosure provides such improvements to the art.

DETAILED DESCRIPTION

Figure 1:
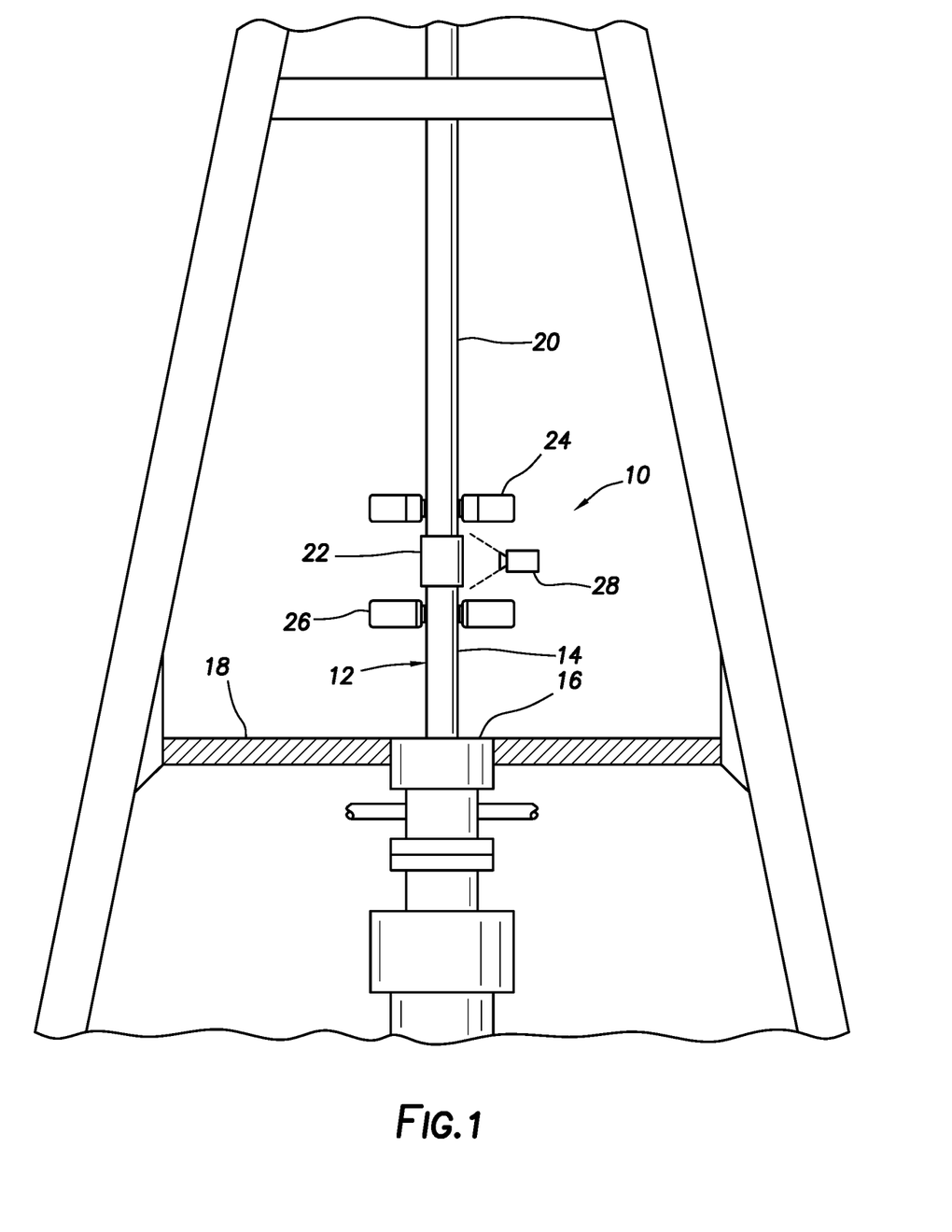
FIG. 1 is a representative partially cross-sectional view of an example of a well system and associated method which can embody principles of this disclosure.

Representatively illustrated in FIG. 1 is a system 10 for use with a subterranean well, and an associated method, which can embody principles of this disclosure. However, it should be clearly understood that the system 10 and method are merely one example of an application of the principles of this disclosure in practice, and a wide variety of other examples are possible. Therefore, the scope of this disclosure is not limited at all to the details of the system 10 and method described herein and/or depicted in the drawings.

In the FIG. 1 example, a tubular string 12 is being assembled and deployed into a well. The tubular string 12 in this example is a production or injection tubing string, but in other examples the tubular string could be a casing, liner, drill pipe, completion, stimulation, testing or other type of tubular string. The scope of this disclosure is not limited to use of any particular type of tubular string or tubular components connected in a tubular string.

As depicted in FIG. 1, a tubular 14 is suspended near its upper end by means of a rotary table 16, which may comprise a pipe handling spider and/or safety slips to grip the tubular 14 and support a weight of the tubular string 12. In this manner, the upper end of the tubular 14 extends upwardly through a rig floor 18 in preparation for connecting another tubular 20 to the tubular string 12.

In this example, a tubular coupling 22 is made-up to the upper end of the tubular 14 prior to the tubular being connected in the tubular string 12. The coupling 22 is internally threaded in each of its opposite ends.

In conventional well operations, it is common for a threaded together tubular and coupling to be referred to as a "joint" and for threaded together joints to be referred to as a "stand" of tubing, casing, liner, pipe, etc. However, in some examples, a separate coupling may not be used; instead one end (typically an upper "box" end of a joint) is internally threaded and the other end (typically a lower "pin" end of the joint) is externally threaded, so that successive joints can be threaded directly to each other. Thus, the scope of this disclosure can encompass the use of a separate coupling with a tubular, or the use of a tubular without a separate coupling (in which case the coupling can be considered to be integrally formed with, and a part of, the tubular). In the FIG. 1 example, the coupling 22 can also be considered to be a tubular, since it is a tubular component connected in the tubular string 12.

To make-up a threaded connection between the tubular 20 and the coupling 22, a set of tongs or rotary and backup clamps 24, 26 are used. The rotary clamp 24 in the FIG. 1 example is used to grip, rotate and apply torque to the upper tubular 20 as it is threaded into the coupling 22. The backup clamp 26 in the FIG. 1 example is used to grip and secure the lower tubular 14 against rotation, and to react the torque applied by the rotary clamp 24. The rotary clamp 24 and the backup clamp 26 may be separate devices, or they may be components of a rig apparatus known to those skilled in the art as an "iron roughneck."

In one example, the rotary clamp 24 and backup clamp 26 may be components of a tong system, such as the VERO™ tong system marketed by Weatherford International, Inc. of Houston, Tex. USA. In this example, the rotary clamp 24 may be a mechanism of the tong system that rotates and applies torque to the upper tubular 20, and the backup clamp 26 may be a backup mechanism of the tong system that reacts the applied torque and prevents rotation of the lower tubular 14. Thus, the term "rotary clamp" as used herein indicates the rotation and torque application mechanism, and the term "backup clamp" as used herein indicates the torque reacting mechanism.

Note that it is not necessary for the tubulars 14, 20 (and coupling 22, if used) to be vertical in the make-up or break-out operations. The tubulars 14, 20 could instead be horizontal or otherwise oriented. Additional systems in which the principles of this disclosure may be incorporated include the CAM™, COMCAM™ and TORKWRENCH™ bucking systems marketed by Weatherford International, Inc.

In other examples, a top drive (see FIG. 3) may be used to rotate and apply torque to the upper tubular 20. Thus, it will be appreciated that the scope of this disclosure is not limited to use of any particular equipment to grip, rotate, apply torque to, or react torque applied to, any tubular in a threaded connection make-up or break-out operation.

After the upper tubular 20 is properly made-up to the lower tubular 14 or coupling 22, the tubular string 12 can be lowered further into the well, and the make-up operation can be repeated to connect another stand to the upper end of the tubular string. In this manner, the tubular string 12 is progressively deployed into the well by connecting successive stands to the upper end of the tubular string. In some examples, an individual tubular component may be added to the tubular string 12, instead of a stand.

In the FIG. 1 method, the threaded connection make-up process can be controlled, so that a properly made-up connection is obtained, and this control can be automatic, so that human error is avoided. As described more fully below, at least one camera 28 can be used in certain examples to facilitate this automatic control of the threaded connection make-up process.

As used herein, the term "camera" is used to indicate a device capable of obtaining images of an observed structure. Each image can comprise an array or matrix of pixels, with each pixel having a combination of optical characteristics. Examples of cameras include digital video cameras, time of flight sensors and optical matrix sensors. Preferably, a camera does not contact a structure observed by the camera.

Figure 2A:
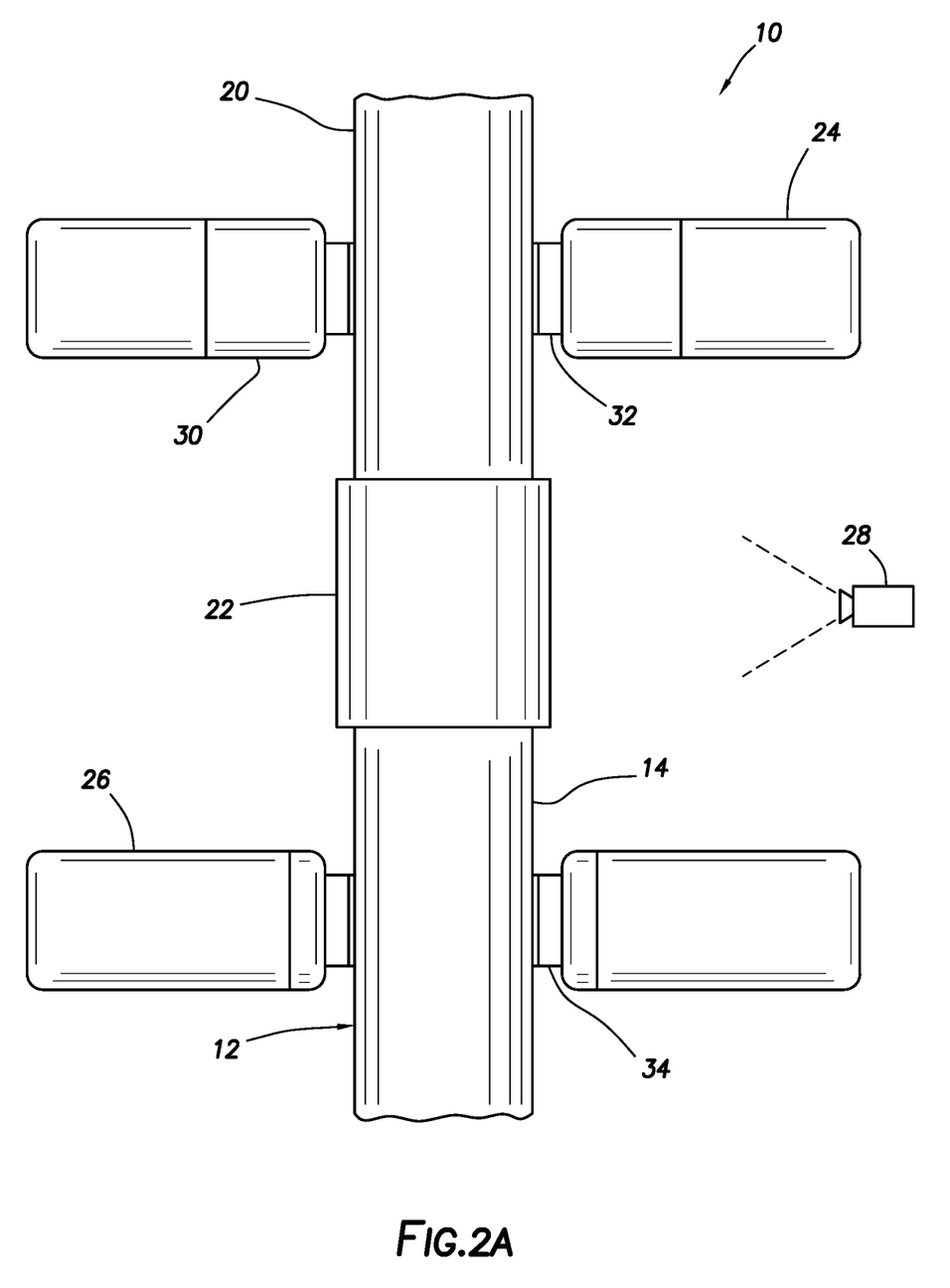
FIG. 2A is a representative side view of an example of the method, with a single camera observing and obtaining images of multiple threaded tubulars.

Referring additionally now to FIG. 2A, an example of the method of making-up tubular string components is representatively illustrated. For convenience, this example of the method is described below as it may be used with the system 10 of FIG. 1, but the method may be used with other systems in keeping with the principles of this disclosure.

In the FIG. 2A example, the camera 28 observes and obtains images of at least the tubulars 14, 20, the coupling 22 and a rotor 30 of the rotary clamp 24 while the tubular 20 is threaded into the coupling. Jaws 32 carried in the rotor 30 grip the tubular 20 in order to apply torque to the tubular 20 as it is threaded into the coupling 22. Jaws 34 of the backup clamp 26 grip the tubular 14 in order to react the torque applied by the rotary clamp 24.

Image data is output from the camera 28. As described more fully below, the image data is input to an image processor 36 (see FIG. 6). The image processor 36 detects displacements of the various structures observed by the camera 28 using optical flow techniques. These optical flow techniques include grouping optical vector fields representing movements of the various components observed by the camera 28. As used herein, the term "displacement" is used to indicate longitudinal or rotational movement, or a combination of longitudinal and rotational movements (e.g., helical displacement).

The movements of the components observed by the camera 28 can then be compared to determine when a proper threaded connection has been achieved, or if a proper threaded connection can be achieved. A controller 38 (see FIG. 6) controls the connection make-up process based on these determinations. For example, the controller 38 may control operation of the rotary clamp 24 so that a predetermined number of turns of the tubular 20 are accomplished, or so that a total thread loss (e.g., a longitudinal overlap between threaded-together components) is achieved.

In the FIG. 2A example, the camera 28 can observe components (such as the tubular 20 and the rotor 30) that displace during the connection make-up process, as well as components (such as the tubular 14 and coupling 22) that should remain stationary during the connection make-up process. In this manner, slippage between the rotor 30 and the tubular 20 can be detected if there is a difference between rotational displacements of the rotor and the tubular 20. Similarly, slippage between the jaws 34 of the backup clamp 26 and the tubular 14 can be detected if there is rotation of the tubular 14 and the coupling 22 during the connection make-up process.

Longitudinal displacement of the tubular 20 into the coupling 22 can be detected, so that the connection make-up process can be terminated by the controller 38 when the total thread loss is within a predetermined range. Similarly, a number of turns of the tubular 20 as it is threaded into the coupling 22 can be detected, so that the connection make-up process can be terminated by the controller 38 when the number of turns is within a predetermined range.

Detection of the displacements of the components as discussed above are facilitated by the use of the camera 28 to observe multiple components during the connection make-up process. A single camera 28 may observe one, two, three, four, or any other number of components. However, it is not necessary that only a single camera be used to observe all of the components for which it is desired to determine displacements.

Figure 2B:
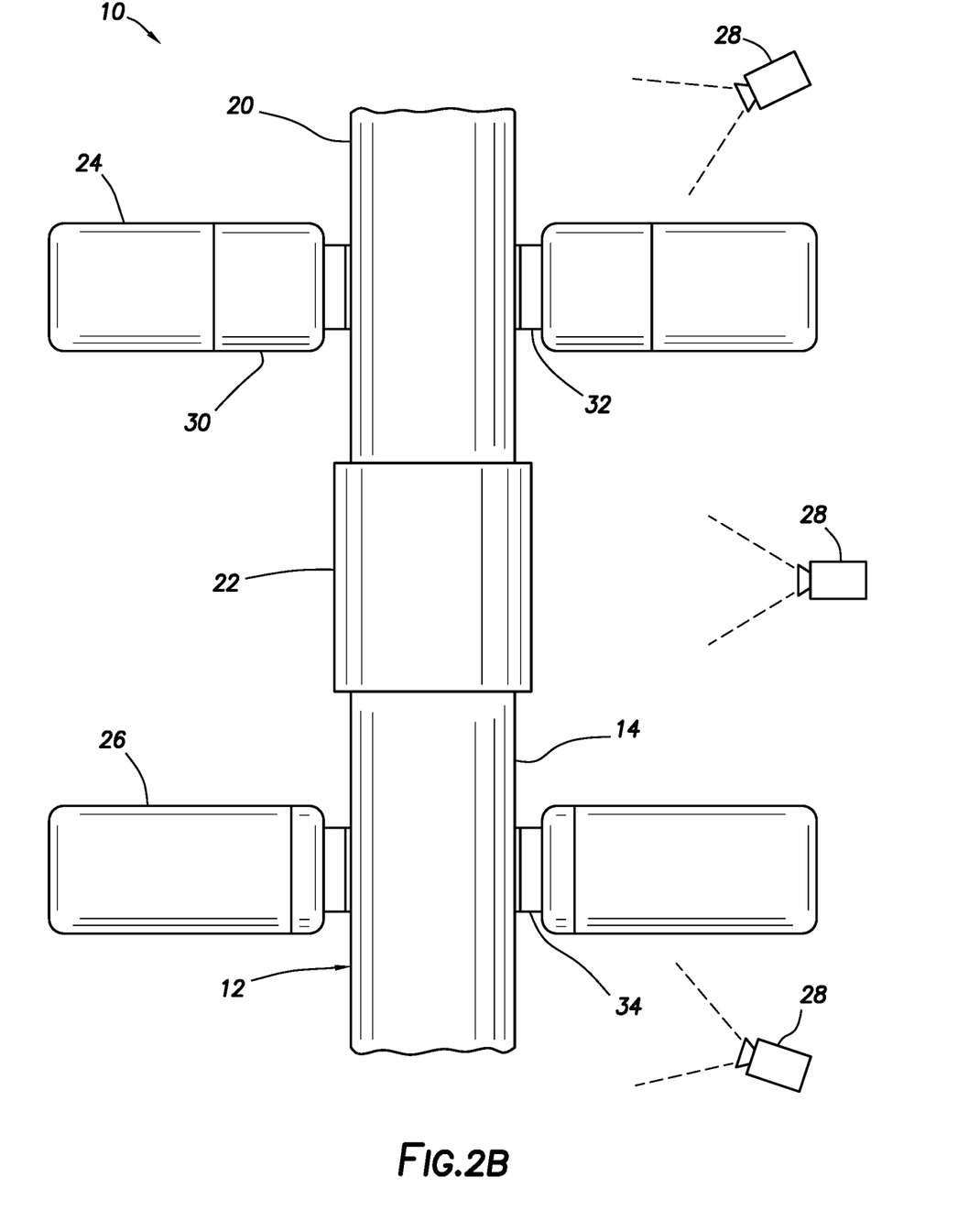
FIG. 2B is a representative side view of the FIG. 2A example of the method, with multiple cameras observing and obtaining images of multiple threaded tubulars.

Referring additionally now to FIG. 2B, another example of the method is representatively illustrated. In this example, multiple cameras 28 are used to observe components of the system 10 during the tubular connection make-up process.

Each one of the cameras 28 may observe a single component or multiple components. As depicted in FIG. 2B, an upper camera 28 observes the rotor 30 and the tubular 20. A middle camera 28 observes the tubulars 14, 20 and the coupling 22. A lower camera 28 observes the tubular 14 and the backup clamp 26.

Image data from the multiple cameras 28 can be combined by the image processor 36, so that the movements of all of the components can be determined using the optical flow techniques discussed more fully below. Based on these detected movements, the controller 38 can control the connection make-up process.

Figure 3:
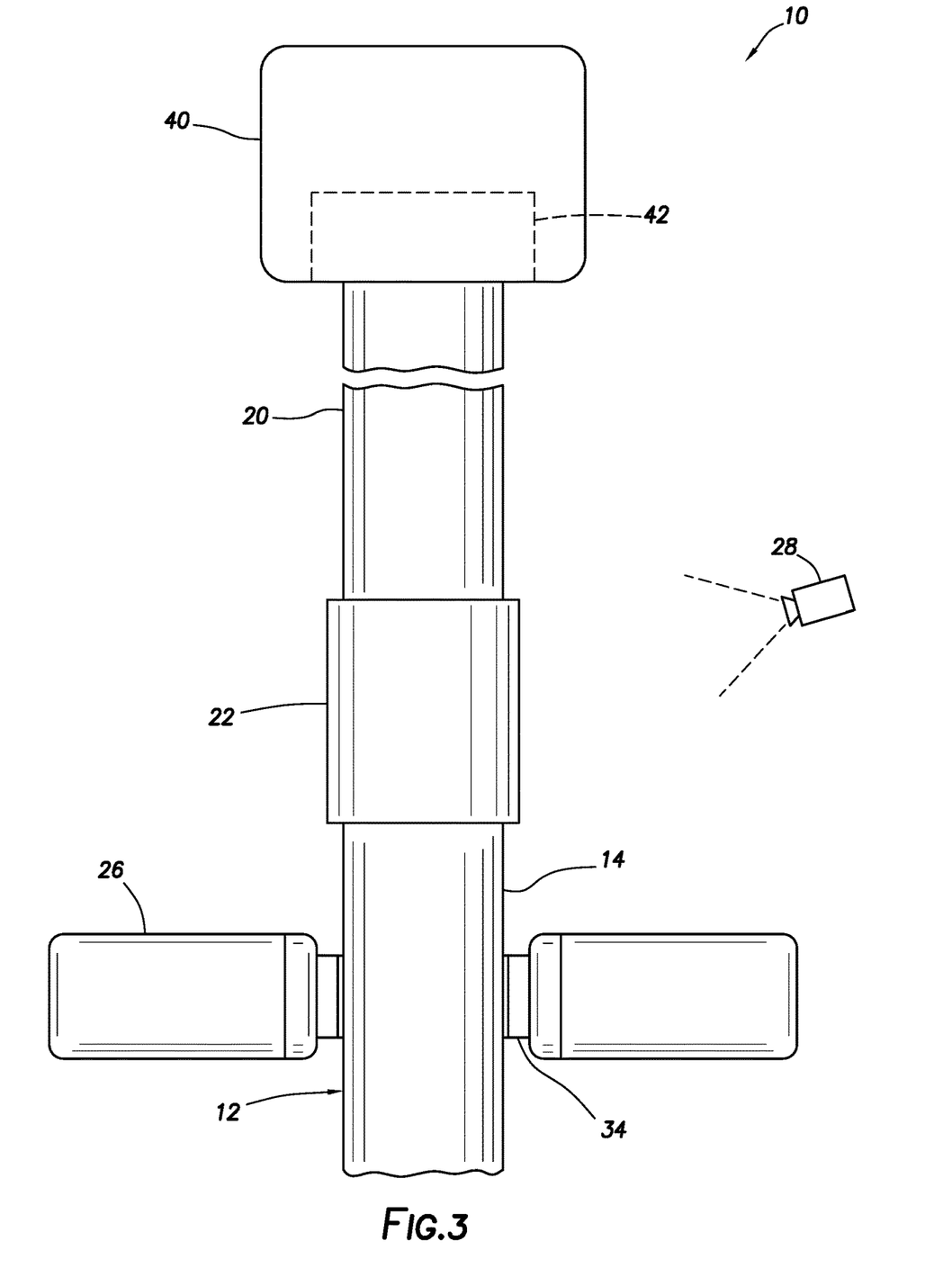
FIG. 3 is a representative side view of another example of the method, with a single camera observing and obtaining images of multiple threaded tubulars.

Referring additionally now to FIG. 3, another example of the method is representatively illustrated. In this example, a top drive 40 is used to rotate and apply torque to the tubular 20. The backup clamp 26 reacts the torque applied by the top drive 40.

The camera 28 can observe any, or any combination of, the tubular 20, the coupling 22, the tubular 14 and the backup clamp 26. Multiple cameras 28 may be used if desired.

The rotor 42 of the top drive 40 is used to rotate and apply torque to the tubular 20. The camera 28, or another camera, can observe the rotor 42 and the tubular 20 during the tubular connection make-up process.

Figure 4:
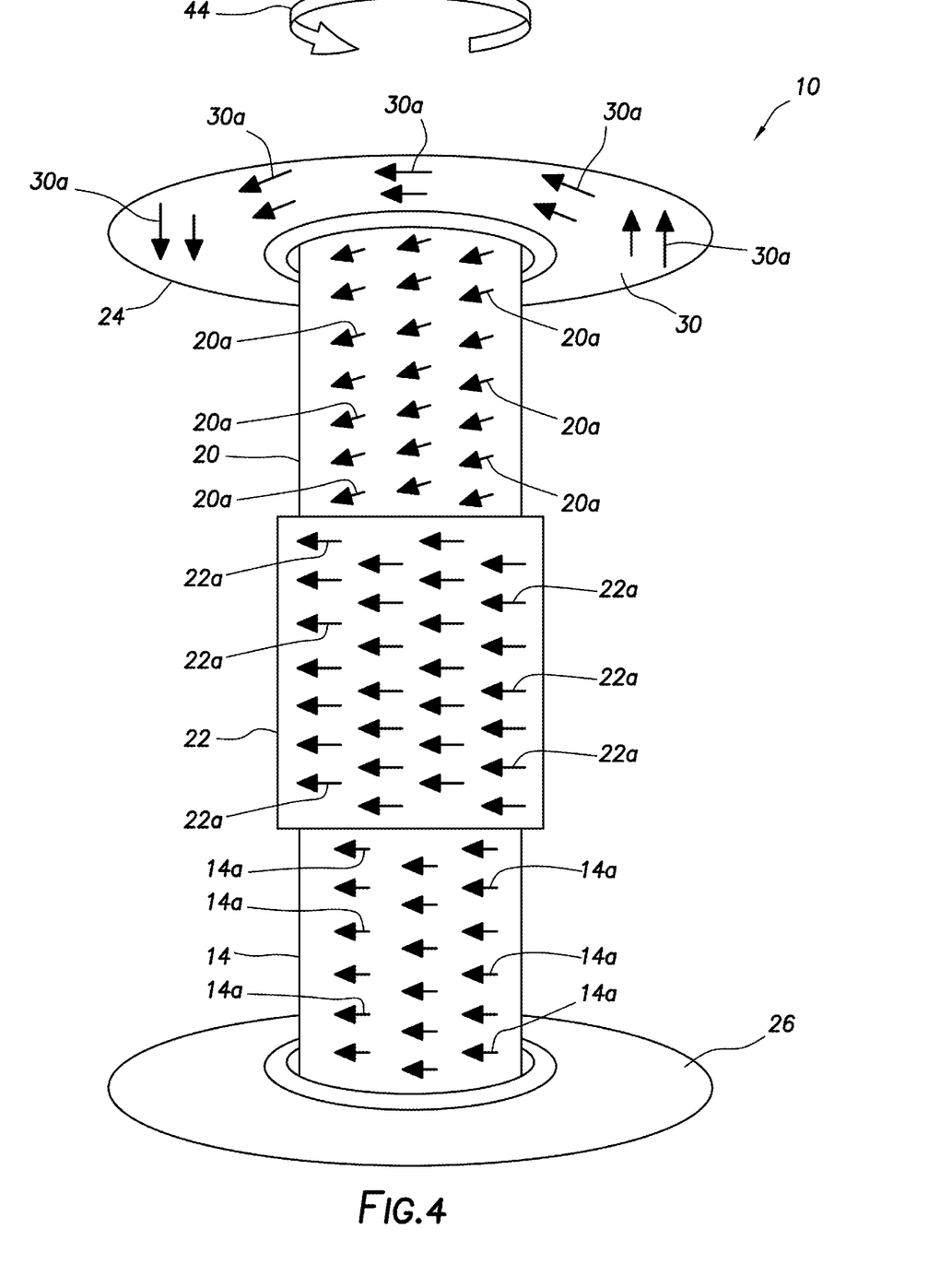
FIG. 4 is a representative view of the FIG. 2A method, in which optical flow vector fields are superimposed on components of the system.

Referring additionally now to FIG. 4, various components of the system 10 are representatively illustrated as observed by the camera 28 in the example of FIG. 2A. Optical vector fields representing detected movements of the components are superimposed on the illustrated components. The vector fields result from the optical flow techniques discussed above.

Rotation of the tubular 20 by the rotor 30 of the rotary clamp 24 is represented by an arrow 44 in FIG. 4. Note that a group of vectors 30a indicate this rotation of the rotor 30 and can be detected by the image processor 36 with appropriate instruction, programming and/or training.

Another group of vectors 20*a* indicate a similar rotation of the tubular 20. The vectors 20*a* also indicate longitudinal displacement of the tubular 20 as it is threaded into the coupling 22. The rotation and longitudinal displacement of the tubular 20, as indicated by the vectors 20*a* can be detected by the image processor 36 with appropriate instruction, programming and/or training.

Although in a normal connection make-up process the tubular 14 and the coupling 22 should not rotate, rotation of these components is depicted in FIG. 4 for convenience in describing a condition that may cause the controller 38 to terminate the connection make-up process. In this example, a group of vectors 22*a* indicate rotation of the coupling 22, and a group of vectors 14*a* indicate rotation of the tubular 14. These groups of vectors 14*a*, 22*a* can be detected by the image processor 36 with appropriate instruction, programming and/or training.

The controller 38 may terminate the connection make-up process (e.g., by ceasing the rotation of the rotor 30) if any of the following conditions is indicated by the optical vector fields:

1. The rotor 30 rotates at a faster rate than the tubular 20. This condition can result from slippage of the jaws 32 (see FIG. 2A) on the tubular 20.
2. The coupling 22 rotates. This condition can result from slippage of the jaws 34 (see FIG. 2A) on the tubular 14.
3. The tubular 14 rotates. This condition can result from slippage of the jaws 34 (see FIG. 2A) on the tubular 14.
4. The coupling 22 rotates relative to the tubular 14. This condition can result from improper make-up of the coupling 22 to the tubular 14 prior to the threading of the tubular 20 into the coupling.
5. The tubular 20 rotates a predetermined number of turns (or within a predetermined range of turns) as it is threaded into the coupling 22. This condition may indicate a proper make-up of the threaded connection between the tubular 20 and the coupling 22.
6. The tubular 20 displaces longitudinally downward a predetermined distance (or within a predetermined distance range) as it is threaded into the coupling 22. This condition may indicate a proper make-up of the threaded connection between the tubular 20 and the coupling 22.

In a tubular connection break-out operation, the controller 38 may terminate the connection break-out process (e.g., by ceasing the rotation of the rotor 30) if the rotor 30 rotates at a faster rate than the tubular 20, the coupling 22 rotates relative to the tubular 14, or if the tubular 14 rotates.

Figure 5:
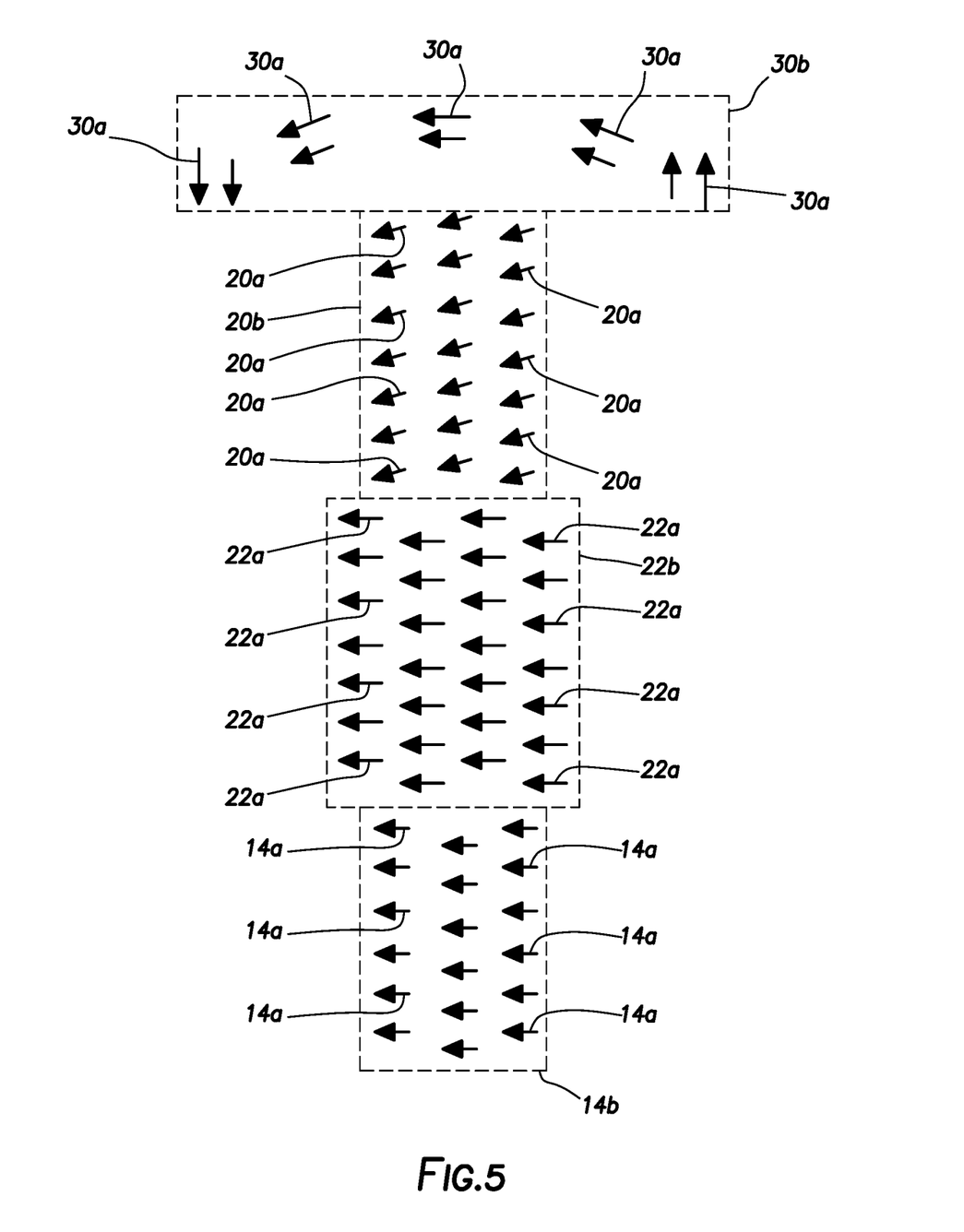
FIG. 5 is a representative view of the FIG. 2A method, in which the optical flow vector fields are separated into groups.

Referring additionally now to FIG. 5, the groups of the optical vectors 14*a*, 20*a*, 22*a*, 30*a* are representatively illustrated apart from the components of the system 10. In this view, the manner in which the image processor 36 can detect optical vector fields in the image data output by the camera 28 can be more readily visualized.

As mentioned above, optical flow techniques are used to detect the optical vectors 14*a*, 20*a*, 22*a*, 30*a* represented in the image data. For example, prior to the connection make-up process, the camera 28 may observe the environment of the rig floor 18 (see FIG. 1) as a background reference to produce a reference image. Then, at a start of the connection make-up process, the camera 28 begins observing the various components involved (such as the tubulars 14, 20, the coupling 22 and the rotor 30).

While the tubular 20 is threaded into the coupling 22, the image processor 36 detects the optical vectors 14*a*, 20*a*, 22*a*, 30*a* in real time by comparing later (or current) image data to earlier (or past) image data. Based on appropriate instruction, programming and/or training, the image processor 36 is able to group the vectors 14*a*, 20*a*, 22*a*, 30*a* into respective vector fields 14*b*, 20*b*, 22*b*, 30*b*.

For example, an operator could input to a control system 46 (see FIG. 6) a known diameter and length of the coupling 22, and the image processor 36 can use this information to identify a group of vectors 22*a* corresponding to this diameter and length as being a vector field 22*b* representing displacement of the coupling. Similarly, reduced diameter components are typically expected to be positioned on opposite sides of the coupling 22, so the image processor 36 can use this information to identify a group of vectors 14*a*, 20*a* corresponding to this reduced diameter as being vector fields 14*b*, 20*b* representing displacements of the respective tubulars 14, 20. In a similar manner, the rotor 30 is typically expected to be positioned above the connection and to have a larger diameter than the tubular 20, so the image processor 36 can use this information to identify a group of vectors 30*a* corresponding to this diameter and position as being a vector field 30*b* representing displacement of the rotor.

The above are merely examples of possible ways in which the image processor 36 can be instructed, programmed or trained to detect the various components and displacements of the components represented in the image data output by the camera 28. Other techniques known to those skilled in the optical image processing art may be utilized in keeping with the principles of this disclosure. Neural or neuronal networks, fuzzy logic and other artificial intelligence techniques or programmed capabilities may be particularly useful in detecting the various components and displacements of the components represented in the image data output by the camera 28.

Figure 6:
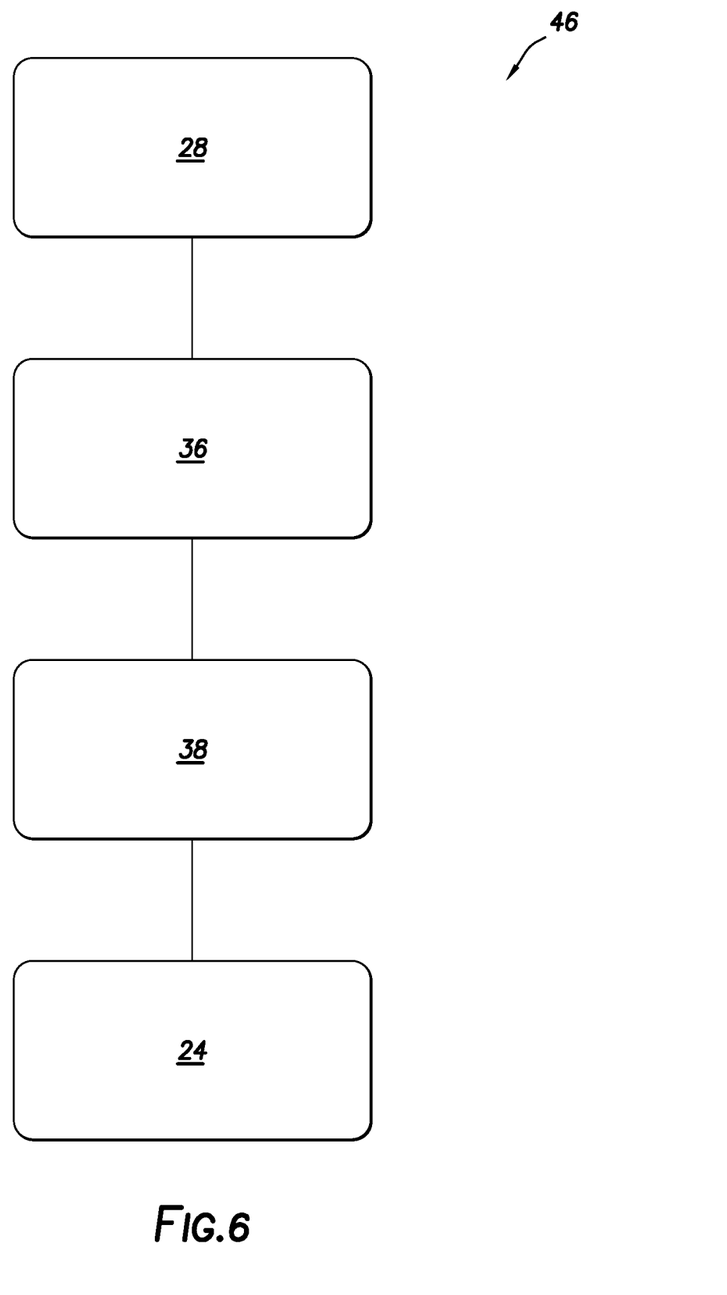
FIG. 6 is a representative schematic view of an example of a control system that may be used with the method examples of FIGS. 2A-5.

Referring additionally now to FIG. 6, the control system 46 is representatively illustrated in schematic form. The control system 46 may be used with the system 10 example of FIG. 1 and the method examples of FIGS. 2A-5, or the control system may be used with other systems and methods.

The control system 46 includes the controller 38 for controlling operation of various components of the system 10. In this example, the controller 38 is connected to the rotary clamp 24 for controlling rotation of the tubular 20. In examples described above, the controller 38 can terminate or cease the rotation of the tubular 20 by the rotary clamp 24 or top drive 40 when a proper threaded connection has been achieved, (for example, to avoid over-torquing the threaded connection, to avoid human error, to achieve a greater level of efficiency, etc.), or the controller can terminate rotation of the tubular 20 when a proper threaded connection cannot be achieved (for example, due to slippage between the jaws 32 and the tubular 20 or slippage between the jaws 34 and the tubular 14), or the controller can terminate rotation of the tubular 20 when a properly unthreaded or broken-out connection cannot be achieved (for example, due to slippage between the jaws 32 and the tubular 20, slippage between the jaws 34 and the tubular 14 or unthreading of the coupling 24 from the tubular 14). The scope of this disclosure is not limited to any particular purpose or benefit obtained by use of the controller 38 in the control system 46.

The controller 38 can include various components designed to facilitate the operation of the system 46. For example, the controller 38 may include volatile and non-volatile memory (such as RAM, ROM, EPROM, a hard drive or solid state drive, etc.), a database and instructions stored in the memory, data ports, input devices (such as a keyboard, keypad, touch screen, mouse, etc.), output devices (such as a monitor, a printer, etc.), communication devices (such as a satellite link, a fiber optic connection, a WiFi or Bluetooth transceiver, etc.), a computer processor, a programmable logic controller (PLC) or any other component or combination of components. The scope of this disclosure is not limited to any particular configuration, structure or capability of the controller 38.

As depicted in FIG. 6, at least one camera 28 is connected to the image processor 36. The image processor 36 receives image data from the camera 28 and, based on the image data, identifies or recognizes tubular string components (such as the tubulars 14, 20, coupling 22 and/or rotor 30 or 42) as represented in the image data. In addition, the image processor 36 identifies or recognizes movements of the components as represented in the image data.

The image processor 36 can include various components and capabilities designed to facilitate the identification or recognition of the components and their movements. For example, the image processor 36 may include neural or neuronal networks, fuzzy logic, artificial intelligence or other programmed capabilities that may be trained to identify or recognize particular tubular string components. The image processor 54 may include or comprise elements known to those skilled in the art as an image processing engine, an image processing unit or an image signal processor. Optical flow techniques can be used to identify, recognize and quantify movements (such as longitudinal displacements and/or rotations) of the components. The scope of this disclosure is not limited to any particular configuration, structure or capability of the image processor 36.

It may now be fully appreciated that the above disclosure provides significant advancements to the art of making-up threaded connections in tubular strings. In various examples described above, methods are provided which produce properly made-up threaded connections in a manner that reduces or eliminates human error and improves efficiency of the threaded connection make-up process.

More specifically, the above disclosure provides to the art a method of making-up tubular string components for use in a subterranean well. In one example, the method can include the steps of: threading first and second tubulars 20, 22 with each other while a first camera 28 obtains images of the first and second tubulars 20, 22; outputting image data from the first camera 28 to an image processor 36; the image processor 36 detecting optical flow vector fields from the image data, the optical flow vector fields representing first and second displacements of the respective first and second tubulars 20, 22 during the threading; and controlling the threading in response to a difference between the first and second displacements.

The threading step may comprise threading together the first and second tubulars 20, 22, for example, to make-up a threaded connection. Alternatively, the threading step may comprise unthreading the first and second tubulars 20, 22 from each other, for example, to break-out the threaded connection.

The first camera 28 may obtain images of a threaded third tubular 14 during the threading step. The second and third tubulars 22, 14 may be threaded together prior to the threading step.

The first camera 28 may obtain images of a rotor 30 of a rotary clamp 24 or a rotor 42 of a top drive 40 during the threading step.

The controlling step may include controlling the threading in response to a difference between the first displacement of the first tubular 20 and a third displacement of the rotor 30 or 42. The first and third displacements may comprise rotations of the respective first tubular 20 and the rotor 30 or 42.

The controlling step may include controlling the threading in response to the second displacement of the second tubular 22 being greater than zero. The second displacement may comprise a rotation of the second tubular 22.

The controlling step may include controlling the threading in response to the first displacement of the first tubular 20 being within a predetermined range. The first displacement may comprise a longitudinal displacement of the first tubular 20.

The controlling step may include controlling the threading in response to the first displacement of the first tubular 20 being within a predetermined range. The first displacement may comprise a rotation of the first tubular 20.

The controlling step may include controlling the threading in response to the optical flow vector fields representing a predetermined difference between the first and second displacements.

The method may include a second camera 28 obtaining images of a threaded third tubular 14 and at least one of the first and second tubulars 20, 22 during the threading. The optical flow vector fields may represent a third displacement of the third tubular 14 and at least one of the first and second displacements during the threading step.

The method may include a second camera 28 obtaining images of a rotor 30, 42 of a rotary clamp 24 or a top drive 40 and at least one of the first and second tubulars 20, 22. The optical flow vector fields may represent a third displacement of the rotor 30, 42 and at least one of the first and second displacements during the threading step.

Another method of making-up tubular string components for use in a subterranean well is provided to the art by the above disclosure. In this example, the method can include: positioning a first camera 28 at a first location, the first camera 28 thereby simultaneously observing at least threaded first and second tubulars 20, 22; threading the first and second tubulars 20, 22 with each other; outputting image data from the first camera 28 to an image processor 36; the image processor 36 detecting optical flow vector fields from the image data, the optical flow vector fields representing first and second displacements of the respective first and second tubulars 20, 22 during the threading; and controlling the threading in response to the image processor 36 detecting the optical flow vector fields.

The threading step may comprise threading together the first and second tubulars 20, 22, for example, to make-up a threaded connection. Alternatively, the threading step may comprise unthreading the first and second tubulars 20, 22 from each other, for example, to break-out the threaded connection.

The positioning step may include positioning the first camera 28 at the first location, the first camera 28 thereby simultaneously observing at least the first and second tubulars 20, 22 and a threaded third tubular 14. The second and third tubulars 22, 14 may be threaded together prior to the threading step.

The positioning step may include positioning the first camera 28 at the first location, the first camera 28 thereby simultaneously observing at least the first and second tubulars 20, 22 and a rotor 30 of a rotary clamp 24, or a rotor 42 of a top drive 40.

The controlling step may include controlling the threading in response to a difference between the first displacement of the first tubular 20 and a third displacement of the rotor 30, 42. The first and third displacements may comprise rotations of the respective first tubular 20 and the rotor 30, 42.

The controlling step may include controlling the threading in response to the second displacement of the second tubular 22 being greater than zero. The second displacement may comprise a rotation of the second tubular 22.

The controlling step may include controlling the threading in response to the first displacement of the first tubular 20 being within a predetermined range. The first displacement may comprise a longitudinal displacement of the first tubular 20.

The controlling step may include controlling the threading in response to the first displacement of the first tubular 20 being within a predetermined range. The first displacement may comprise a rotation of the first tubular 20.

The controlling step may include controlling the threading in response to the optical flow vector fields representing a predetermined difference between the first and second displacements.

The method may include positioning a second camera 28 at a second location, the second camera 28 thereby simultaneously observing a threaded third tubular 14 and at least one of the first and second tubulars 20, 22. The optical flow vector fields may represent a third displacement of the third tubular 14 and at least one of the first and second displacements during the threading.

The method may include positioning a second camera 28 at a second location, the second camera 28 thereby simultaneously observing a rotor 30 or 42 of a rotary clamp 24 or a top drive 40, and at least one of the first and second tubulars 20, 22. The optical flow vector fields representing a third displacement of the rotor 30 and at least one of the first and second displacements during the threading.

Although various examples have been described above, with each example having certain features, it should be understood that it is not necessary for a particular feature of one example to be used exclusively with that example. Instead, any of the features described above and/or depicted in the drawings can be combined with any of the examples, in addition to or in substitution for any of the other features of those examples. One example's features are not mutually exclusive to another example's features. Instead, the scope of this disclosure encompasses any combination of any of the features.

Although each example described above includes a certain combination of features, it should be understood that it is not necessary for all features of an example to be used. Instead, any of the features described above can be used, without any other particular feature or features also being used.

It should be understood that the various embodiments described herein may be utilized in various orientations and configurations, without departing from the principles of this disclosure. The embodiments are described merely as examples of useful applications of the principles of the disclosure, which is not limited to any specific details of these embodiments.

In the above description of the representative examples, directional terms (such as "above," "below," "upper," "lower," "upward," "downward," etc.) are used for convenience in referring to the accompanying drawings. However, it should be clearly understood that the scope of this disclosure is not limited to any particular directions described herein.

The terms "including," "includes," "comprising," "comprises," and similar terms are used in a non-limiting sense in this specification. For example, if a system, method, apparatus, device, etc., is described as "including" a certain feature or element, the system, method, apparatus, device, etc., can include that feature or element, and can also include other features or elements. Similarly, the term "comprises" is considered to mean "comprises, but is not limited to."

Of course, a person skilled in the art would, upon a careful consideration of the above description of representative embodiments of the disclosure, readily appreciate that many modifications, additions, substitutions, deletions, and other changes may be made to the specific embodiments, and such changes are contemplated by the principles of this disclosure. For example, structures disclosed as being separately formed can, in other examples, be integrally formed and vice versa. Accordingly, the foregoing detailed description is to be clearly understood as being given by way of illustration and example only, the spirit and scope of the invention being limited solely by the appended claims and their equivalents.

What is claimed is:

1. A method of making-up or breaking-out tubular string components for use in a subterranean well, the method comprising:
    threading first and second tubulars with each other while a first camera obtains images of the first and second tubulars;
    outputting image data from the first camera to an image processor;
    the image processor detecting optical flow vector fields from the image data, the optical flow vector fields representing first and second displacements of the respective first and second tubulars during the threading;
    controlling the threading in response to a difference between the first and second displacements;
    a second camera obtaining images of a threaded third tubular and at least one of the first and second tubulars during the threading; and
    the optical flow vector fields representing a third displacement of the third tubular and at least one of the first and second displacements during the threading.

2. The method of claim 1, in which the first camera obtains images of the threaded third tubular during the threading, and in which the second and third tubulars are threaded together prior to the threading.

3. The method of claim 1, in which the first camera obtains images of a rotor during the threading.

4. The method of claim 3, in which the controlling comprises controlling the threading in response to a difference between the first displacement of the first tubular and a third displacement of the rotor, and in which the first and third displacements comprise rotations of the respective first tubular and the rotor.

5. The method of claim 1, in which the controlling comprises controlling the threading in response to the second displacement of the second tubular being greater than zero, and in which the second displacement comprises a rotation of the second tubular.

6. The method of claim 1, in which the controlling comprises controlling the threading in response to the first displacement of the first tubular being within a predetermined range, and in which the first displacement comprises a longitudinal displacement of the first tubular.

7. The method of claim 1, in which the controlling comprises controlling the threading in response to the first displacement of the first tubular being within a predetermined range, and in which the first displacement comprises a rotation of the first tubular.

8. The method of claim 1, in which the controlling comprises controlling the threading in response to the optical flow vector fields representing a predetermined difference between the first and second displacements.

9. A method of making-up or breaking-out tubular string components for use in a subterranean well, the method comprising:
   threading first and second tubulars with each other while a first camera obtains images of the first and second tubulars;
   outputting image data from the first camera to an image processor;
   the image processor detecting optical flow vector fields from the image data, the optical flow vector fields representing first and second displacements of the respective first and second tubulars during the threading;
   controlling the threading in response to a difference between the first and second displacements;
   a second camera obtaining images of a rotor and at least one of the first and second tubulars; and
   the optical flow vector fields representing a third displacement of the rotor and at least one of the first and second displacements during the threading.

10. The method of claim 9, in which the first camera obtains images of a threaded third tubular during the threading, and in which the second and third tubulars are threaded together prior to the threading.

11. The method of claim 9, in which the first camera obtains images of the rotor during the threading.

12. The method of claim 11, in which the controlling comprises controlling the threading in response to a difference between the first displacement of the first tubular and a third displacement of the rotor, and in which the first and third displacements comprise rotations of the respective first tubular and the rotor.

13. The method of claim 9, in which the controlling comprises controlling the threading in response to the second displacement of the second tubular being greater than zero, and in which the second displacement comprises a rotation of the second tubular.

14. The method of claim 9, in which the controlling comprises controlling the threading in response to the first displacement of the first tubular being within a predetermined range, and in which the first displacement comprises a longitudinal displacement of the first tubular.

15. The method of claim 9, in which the controlling comprises controlling the threading in response to the first displacement of the first tubular being within a predetermined range, and in which the first displacement comprises a rotation of the first tubular.

16. The method of claim 9, in which the controlling comprises controlling the threading in response to the optical flow vector fields representing a predetermined difference between the first and second displacements.

17. A method of making-up or breaking-out tubular string components for use in a subterranean well, the method comprising:
   positioning a first camera at a first location, the first camera thereby simultaneously observing at least threaded first and second tubulars;
   threading the first and second tubulars with each other;
   outputting image data from the first camera to an image processor;
   the image processor detecting optical flow vector fields from the image data, the optical flow vector fields representing first and second displacements of the respective first and second tubulars during the threading;
   controlling the threading in response to the image processor detecting the optical flow vector fields;
   positioning a second camera at a second location, the second camera thereby simultaneously observing a threaded third tubular and at least one of the first and second tubulars; and
   the optical flow vector fields representing a third displacement of the third tubular and at least one of the first and second displacements during the threading.

18. The method of claim 17, in which the positioning comprises positioning the first camera at the first location, the first camera thereby simultaneously observing at least the first and second tubulars and the threaded third tubular, and in which the second and third tubulars are threaded together prior to the threading.

19. The method of claim 17, in which the positioning comprises positioning the first camera at the first location, the first camera thereby simultaneously observing at least the first and second tubulars and a rotor.

20. The method of claim 19, in which the controlling comprises controlling the threading in response to a difference between the first displacement of the first tubular and a third displacement of the rotor, and in which the first and third displacements comprise rotations of the respective first tubular and the rotor.

21. The method of claim 17, in which the controlling comprises controlling the threading in response to the second displacement of the second tubular being greater than zero, and in which the second displacement comprises a rotation of the second tubular.

22. The method of claim 17, in which the controlling comprises controlling the threading in response to the first displacement of the first tubular being within a predetermined range, and in which the first displacement comprises a longitudinal displacement of the first tubular.

23. The method of claim 17, in which the controlling comprises controlling the threading in response to the first displacement of the first tubular being within a predetermined range, and in which the first displacement comprises a rotation of the first tubular.

24. The method of claim 17, in which the controlling comprises controlling the threading in response to the optical flow vector fields representing a predetermined difference between the first and second displacements.

25. A method of making-up or breaking-out tubular string components for use in a subterranean well, the method comprising:
   positioning a first camera at a first location, the first camera thereby simultaneously observing at least threaded first and second tubulars;
   threading the first and second tubulars with each other;
   outputting image data from the first camera to an image processor;
   the image processor detecting optical flow vector fields from the image data, the optical flow vector fields representing first and second displacements of the respective first and second tubulars during the threading;
   controlling the threading in response to the image processor detecting the optical flow vector fields;
   positioning a second camera at a second location, the second camera thereby simultaneously observing a rotor and at least one of the first and second tubulars; and the optical flow vector fields representing a third displacement of the rotor and at least one of the first and second displacements during the threading.

26. The method of claim 25, in which the positioning comprises positioning the first camera at the first location, the first camera thereby simultaneously observing at least the first and second tubulars and a threaded third tubular, and in which the second and third tubulars are threaded together prior to the threading.

27. The method of claim 25, in which the positioning comprises positioning the first camera at the first location, the first camera thereby simultaneously observing at least the first and second tubulars and the rotor.

28. The method of claim 27, in which the controlling comprises controlling the threading in response to a difference between the first displacement of the first tubular and a third displacement of the rotor, and in which the first and third displacements comprise rotations of the respective first tubular and the rotor.

29. The method of claim 25, in which the controlling comprises controlling the threading in response to the second displacement of the second tubular being greater than zero, and in which the second displacement comprises a rotation of the second tubular.

30. The method of claim 25, in which the controlling comprises controlling the threading in response to the first displacement of the first tubular being within a predetermined range, and in which the first displacement comprises a longitudinal displacement of the first tubular.

31. The method of claim 25, in which the controlling comprises controlling the threading in response to the first displacement of the first tubular being within a predetermined range, and in which the first displacement comprises a rotation of the first tubular.

32. The method of claim 25, in which the controlling comprises controlling the threading in response to the optical flow vector fields representing a predetermined difference between the first and second displacements.

* * * * *